United States Patent
Carlsson

(10) Patent No.: US 10,369,938 B2
(45) Date of Patent: Aug. 6, 2019

(54) FLOOR SYSTEM, A VEHICLE, SUCH AS A SERVICE VEHICLE, COMPRISING SUCH A FLOOR SYSTEM AND A METHOD OF INSTALLING SUCH A FLOOR SYSTEM

(71) Applicant: Modul-System HH AB, Molndal (SE)

(72) Inventor: Anders Carlsson, Hisings Backa (SE)

(73) Assignee: MODUL-SYSTEM HH AB, Molndal (SE)

( * ) Notice: Subject to any disclaimer, the term of this patent is extended or adjusted under 35 U.S.C. 154(b) by 0 days.

(21) Appl. No.: 15/319,861

(22) PCT Filed: Jun. 18, 2015

(86) PCT No.: PCT/EP2015/063672
§ 371 (c)(1),
(2) Date: Dec. 19, 2016

(87) PCT Pub. No.: WO2016/005162
PCT Pub. Date: Jan. 14, 2016

(65) Prior Publication Data
US 2017/0136964 A1  May 18, 2017

(30) Foreign Application Priority Data
Jul. 9, 2014 (EP) .................................... 14176339

(51) Int. Cl.
| | | |
|---|---|---|
| *B60R 13/01* | (2006.01) | |
| *B60P 7/08* | (2006.01) | |
| *B60R 5/04* | (2006.01) | |

(52) U.S. Cl.
CPC .......... *B60R 13/011* (2013.01); *B60P 7/0815* (2013.01); *B60R 5/04* (2013.01); *B60R 2013/016* (2013.01); *B60R 2013/018* (2013.01)

(58) Field of Classification Search
CPC ........ B60P 7/08; B60P 7/0815; B60R 13/011; B60R 13/013; B62D 25/2054
(Continued)

(56) References Cited

U.S. PATENT DOCUMENTS

2005/0156095 A1* 7/2005 Vichniakov ............ B23K 20/00
248/500

FOREIGN PATENT DOCUMENTS

| DE | 60315734 T2 | 6/2008 |
| DE | 202008016032 U1 | 4/2010 |

(Continued)

OTHER PUBLICATIONS

English translation of DE 202008016032; retreived Mar. 15, 2018 via PatentTranslate located at www.epo.org. (Year: 2018).*
(Continued)

*Primary Examiner* — Jason S Daniels
(74) *Attorney, Agent, or Firm* — Harness, Dickey & Pierce, P.L.C.

(57) ABSTRACT

A floor system includes multiple floor sections and a floor portion smaller than each of the floor sections. Each floor section includes a floor panel and an integrated securing rail. The floor panel includes opposite first and second edges configured to be arranged next to each other such that the second edge of one floor section is placed facing and adjacent to the first edge of another floor section. The integrated securing rail is fixedly attached to a third edge of the floor panel that extends at a right angle between the first and second edges of the floor panel. The floor portion includes a first outer edge which follows the contour of the integrated securing rail of the first and/or said second floor section and is configured to be adjacent to the integrated securing rail of the first and/or said second floor section during use.

14 Claims, 4 Drawing Sheets

(58) Field of Classification Search
USPC .................................................. 296/193.07
See application file for complete search history.

(56) References Cited

FOREIGN PATENT DOCUMENTS

| | | | |
|---|---|---|---|
| EP | 1894774 A1 * | 3/2008 | ............ B60R 11/00 |
| EP | 2708415 A2 * | 3/2014 | ............ B60P 7/0815 |
| JP | 2003267271 A * | 9/2003 | |
| WO | WO-2005/037597 A1 | 4/2005 | |
| WO | WO-2008/036042 A1 | 3/2008 | |

OTHER PUBLICATIONS

European Office Action dated Oct. 25, 2017 issued in corresponding European Application No. 15163026.6.
International Search Report PCT/ISA/210 for International Application No. PCT/EP2015/063672 dated Sep. 9, 2015.
Written Opinion of the International Searching Authority PCT/ISA/237 for International Application No. PCT/EP2015/063672 dated Sep. 9, 2015.

* cited by examiner

A-A

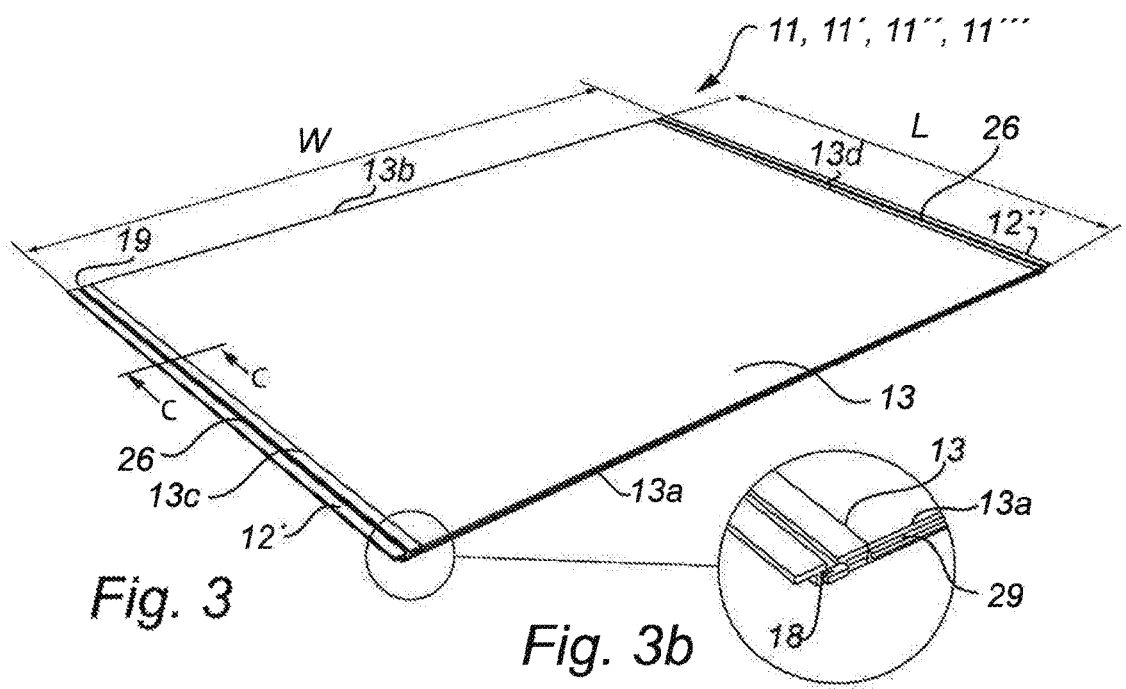
Fig. 3
Fig. 3b
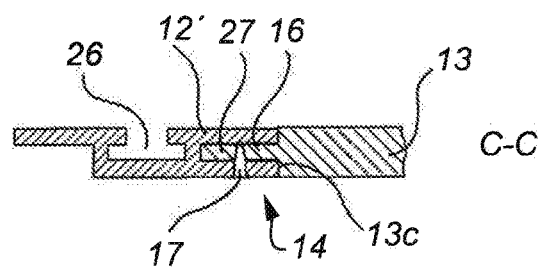
Fig. 3a

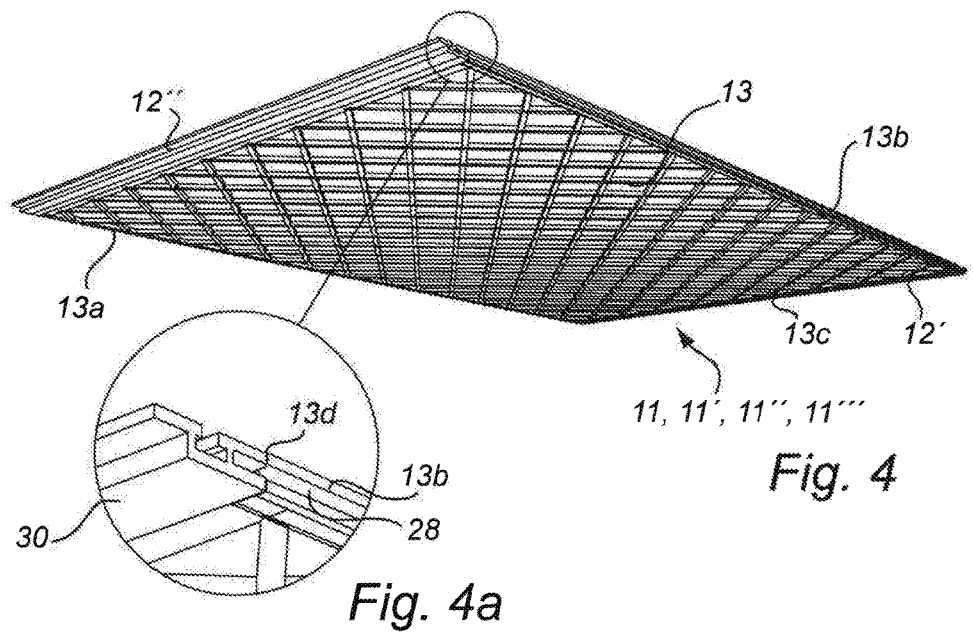
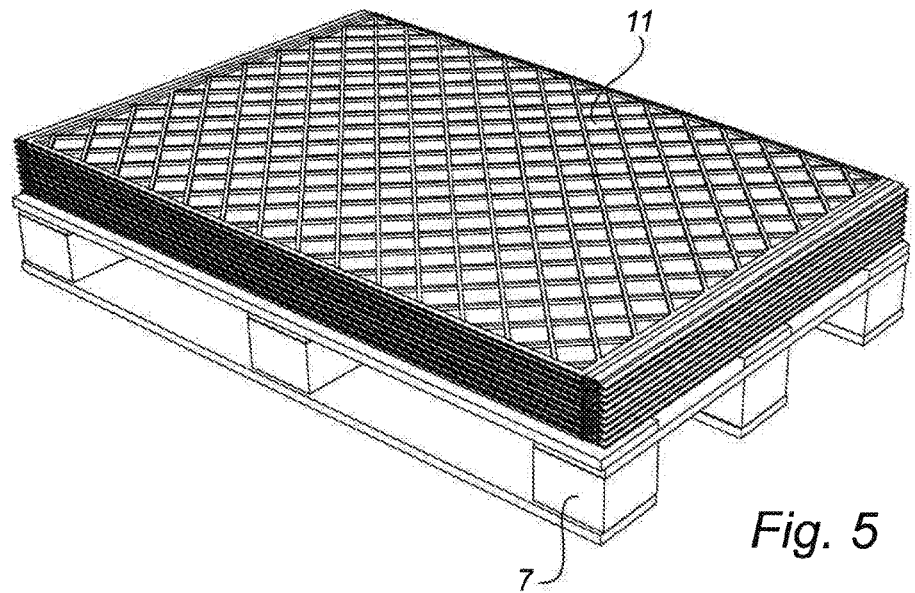

FLOOR SYSTEM, A VEHICLE, SUCH AS A SERVICE VEHICLE, COMPRISING SUCH A FLOOR SYSTEM AND A METHOD OF INSTALLING SUCH A FLOOR SYSTEM

CROSS-REFERENCE TO RELATED APPLICATIONS

This application is the U.S. National Phase application of PCT Application No. PCT/EP2015/063675 filed of Jun. 18, 2015, which claims priority to European Application No. 14176339.1 filed on Jul. 9, 2014, the contents of each of which are incorporated herein by reference.

FIELD OF THE INVENTION

The present invention relates to a floor system, adapted to be arranged on an inner floor of a cargo or a back space of a service vehicle. Furthermore, the present invention discloses a vehicle, such as a service vehicle, comprising such a floor system and a method of installing such a system.

TECHNICAL BACKGROUND

It is common practise in the art of service vehicles to equip a cargo space or a back space of an automotive vehicle with for example cupboards, tool holders, shelves or other module units. This is usually made in a separate step after the vehicle has been manufactured, i.e. the equipping of the vehicle in question is made separately from the manufacturing. Before the vehicle is equipped with specialised equipment, usually the cargo space of the vehicle is provided with a floor, usually made of wood, but the floor might also be made of for example an artificial, plastic material. The floor is usually loosely placed on the floor or fastened to the floor of the cargo space by fasteners, for example, screws which are screwed into the underlying floor or connected to a fastener, for example a ring fastener which is permanently installed in the cargo or back space of the service vehicle. This floor functions as a good support to work, stand and walk upon and is also used as an anchor plate for the module units.

The module unit or a module system, comprising several module units, is often not only attached to the underlying floor but is mostly also at least partly attached to the wall and the purpose is to counteract that the unit tips, for example, in a turn. During retardation of the vehicle the module system or the module unit may, if not securely attached, move forward with a large force and which in a serious scenario may break through into the driver cabin and thereby even cause personal injuries.

Usually a floor is individually made for a specific vehicle model, i.e. the floor is adapted to the length and the width of the vehicle.

The ever increasing demand on flexible and quick installation of module systems are also important requirements. Usually the customer wants to change the working equipment, depending on what kind of work he/she has to do. So instead of replacing equipment one by one, it is desirable that a whole module unit or an entire module system could be changed, which saves time and the customer will always know that he/she has the right equipment with him. Hence, the module system has to be easy to connect and disconnect to the floor.

One example of such a floor system is disclosed in EP1894774, of the present applicant, which discloses a load securing system, for a cargo space in an automotive vehicle. At least two rails are fixable along the cargo space, wherein one of said rails is held by one or more fixing means connectable to respective ring fasteners of the service vehicle and the other rail is held as well by one or more fixing means connectable to respective ring fasteners, and said rails are connected to each other by a bridging element in a space between said rails.

However, there is still a need for a more flexible solution which can be used for all kind of back spaces and cargo spaces of a service vehicle and which is easy and quick to install, safe and yet flexible in order to enable securing various sizes and different shapes of module units.

SUMMARY OF THE INVENTION

The object of the present invention is to provide a floor system that overcomes the above issues.

The invention is based on the insight that by having at least two floor sections, each with fixedly arranged securing rails and a floor portion arranged adjacent to the floor sections a flexible floor system is provided. The invention according to a first aspect relates to a floor system adapted to be arranged on an inner floor of a cargo or a back space of a service vehicle, said floor system comprising
a first and a prefabricated second floor section, each one of said first and said second floor sections comprises
    a floor panel, said floor panel comprising a first edge and a second edge, wherein said first edge is arranged opposite said second edge, said first and said second floor sections are adapted to be arranged next to each other such that said second edge of said floor panel of said first floor section is placed facing and adjacent to, or in contact with said first edge of said floor panel of said second floor section,
    a first securing rail fixedly attached to a third edge of said floor panel, said third edge extending at a right angle from said first edge to said second edge of said floor panel, and
said floor system further comprising
    a floor portion, which is smaller than said first floor section and/or said second floor section and said floor portion comprises a first outer edge which follows a contour of said first securing rail of said first and/or said second floor section and which is adapted to be placed adjacent to or in contact with said first securing rail of said first and/or said second floor section during use.

By having a floor system comprising a first and a second floor section and a separate floor portion a large floor can easily be built up inside a cargo or back space of a service vehicle.

The first and the second floor sections may be floor sections, which all the same have the same dimensions. The supplier of the floor system deliver these prefabricated, i.e. the floor panel with the securing rail is preassembled. These floor sections are then arranged on the inner floor of the cargo or backspace of the vehicle together with one or more floor portions. The floor portion/portions may be adapted to the outer contour of the inner floor of the cargo or back space or the environment inside the cargo or back space by removing material. This can be done when installing the floor portion, or before i.e. they may be prefabricated. Alternatively, they may be both prefabricated and adapted. That is, they may first prefabricated and then further adapted. Alternatively, several smaller floor portions may be arranged together as a puzzle until the whole inner floor or at least a major part of it is covered by the floor system.

The floor sections may be central sections. The central sections may be arranged along the centre line of the vehicle.

According to at least one exemplary embodiment the first and the second floor sections are adapted to be arranged adjacent to or in contact with each other in the longitudinal direction of the service vehicle. This way the first securing rails of the first and the second floor sections will extend in the longitudinal direction of the service vehicle.

Depending on the design of the floor section it can be ensured that the floor system is correctly installed in the service vehicle. The first and the second floor sections are prefabricated. Since they are prefabricated they can be stacked and stored and quickly be delivered to a customer when needed. They can in a next step be quickly installed in the service vehicle, without being dependent on the surrounding, i.e. the outer contour of the inner floor of the cargo or back space of the service vehicle. Other advantages of having several floor sections instead of one large is that if one is damaged, it can easily be replaced by a new one.

The system is not limited to have only a first and a second floor section. There may be more, for example, three or four or more. The amount of floor sections is dependent on the size of the floor sections and of the cargo or the back space of the service vehicle.

According to at least one exemplary embodiment the first floor section and/or said second floor section has an outer width which is so large that said first floor section and/or said floor section fits between two wheel housings which are arranged on either side of said service vehicle.

According to at least one exemplary embodiment the first and the second floor section has an outer width which is 1000 mm or 1200 mm. Most service vehicles have a width around 1200 mm inside the cargo or back space of the service vehicle between the wheel houses, which are protruding into the cargo or back space. However, smaller service vehicles have a width which is around 1000 mm between the wheel houses.

The outer width is defined as the length of the floor section, between two outer edges of the floor section which are perpendicular to said first and said second edges of said floor panel.

According to at least one exemplary embodiment said first floor section and/or said second floor section has a length between said first edge and said second edge, which is equal or smaller than the smallest dimension of a EUR-pallet.

According to at least one exemplary embodiment the first floor section has an outer width which is equal or smaller than the larger dimension of a EUR-pallet. A EUR-pallet may also be called Euro-pallet or EPAL-pallet and is the standard European pallet as specified by the European Pallet Association (EPAL). The EUR-pallet has at the time of writing a dimension of 1200×800 mm. The dimensions are not limited to be according to standard European pallets as specified by the European Pallet Association (EPAL). They may for example have dimensions according to pallets of other standards, for example American standards. According to at least one exemplary embodiment the first floor section has an outer width which is equal or smaller than the larger dimension of a standard American pallet type The standard American pallet type is of 40 by 48 inches (1,016 mm×1,219 mm).

According to at least one exemplary embodiment said first floor section and/or said second floor section has a length between said first edge and said second edge which is equal or smaller than 1000 mm+/−10 mm or more preferably 800 mm+100 mm/−50 mm. It has been realized by the inventor that the length of approximately 800 mm, if all floor sections have the same length, will fit most cargo or back spaces today such that most of the cargo or back space is covered by floor sections in the longitudinal direction of the service vehicle. If there are minor sections of the inner floor which is not covered by the floor sections, for example at the end of the service vehicle, i.e. where the back door of the service vehicle usually is arranged an end floor piece may be arranged in that position. This might be the case, if the longitudinal length of the back space is slightly larger than the floor sections which shall be arranged there on.

The length between the first edge and the second edge may be the same for all floor sections or they may differ.

According to at least one exemplary embodiment said first floor section and said second floor sections has essentially the same outer width. This accomplishes that when the first and the second floor sections are arranged adjacent each other the first securing rails of said first and said second floor sections are aligned with each other.

The floor panel may be made by a plastic material, which for example is injection molded or pressed, or it may be a sandwiched material or any other suitable material. Preferably, it is has an outer surface which is hard-wearing and which will be facing the inside of the service vehicle.

The first securing rail of each floor sections is preferably made of metal. It may for example be an aluminium extruded profile. The securing rail is fixedly attached to the floor panel by for example a tongue/groove connection, which is fixedly secured to each other by screwing the two parts together. However, the securing rail can be fixedly attached to the floor panel in any suitable way. The securing rails and the floor panel may have substantially the same thickness. This way the top (which is adapted to face the inside of the cargo or back space) and the underside (which will be facing the inner floor of the cargo or back space) of each securing rails and the top and the underside of the floor plate are at the same level, i.e. on the same plane. The thickness of the floor panel may be dependent on the material it is made of.

According to at least one exemplary embodiment the first securing rail comprises an undercut groove. The undercut groove may have a cross-section which is T-shaped. That is, the groove in the securing rail may have a cross-section as an upside down shaped T. The module system or module units may be securely connected to said undercut groove. This way the module system or the module units can be safely arranged to the floor without making any damage, for example holes, in the underlying floor, i.e. the inner floor of cargo or back space. However, the first securing rail is not limited to have an undercut groove. The module system or the module units may be connected to the securing rail in any other suitable way, for example screwing into the securing rail.

The floor portion is a side portion. The side portion is to be arranged on the side of the central sections, i.e. the floor sections. The floor portion may fill up the whole space or a part of it between one of the floor sections or both floor sections and one inner side wall of the service vehicle. The floor portion may be made of the same material as the floor panel of the floor sections. It may however differ. The floor portion and the floor panel of said first and/or second floor section are arranged on opposite sides of said securing rail.

According to at least one exemplary embodiment each one of said first and said second floor sections further comprises a second securing rail fixedly attached to a fourth edge of said floor panel, said fourth edge extending at a right angle from said first edge to said second edge of said floor panel opposite said third edge. By having a second securing rail fixedly attached to the floor panel on the opposite side of the first securing rail, further fixation points for the module systems or module units are provided within the service vehicle when the floor system have been installed in the service vehicle. The second securing rail may have the same features as defined above for the first securing rail.

According to at least one exemplary embodiment said securing rail has a longitudinal extension which extends from said first edge to said second edge of said floor panel. With other words said first securing rail has the same length as the third edge of said floor panel. The same applies to the second securing rail, i.e. it has the same length as the fourth edge of said floor panel.

By having a securing rail which has the same length as the outer edge it is fixedly arranged to, it is ensured that fixation points are provided for the module system or the module units from one end of the floor system to the other end in the longitudinal direction of the floor system.

According to at least one exemplary embodiment said floor portion comprises a second outer edge which is adaptable to follow a part of the contour of said inner floor of said cargo or said back space in said vehicle by removing material from said floor portion. This enables that the floor portion can be adapted to the inner dimensions of the service vehicle and fill out the space between one of the floor sections or both floor sections and an inner wall of the cargo or back space.

According to at least one exemplary embodiment said floor portion is a first floor portion, and said floor system further comprises at least one second floor portion, which is smaller than said first and/or said second floor section and said second floor portion discloses a first outer edge which follows a contour of said first securing rail of said first and/or said second floor section and which is adapted to be placed adjacent to or in contact with said first securing rail of said first and/or said second floor section. By having more than one floor portion, an area which have not been covered by the floor sections, can be covered by several small identical or non identical floor portions. Further, there are usually at least two areas in the service vehicle on one side of the service vehicle, for example on the driver side which the floor sections do not cover, and it is usually in front and behind a wheel housing. By having more than one floor portion several areas may be covered and protected.

According to at least one exemplary embodiment said floor portion is a first floor portion and said floor system further comprises at least one second floor portion, which is smaller than said first and/or said second floor section and said second floor portion discloses a first outer edge which follows the contour of said second securing rail of said first and/or said second floor section and which is adapted to be placed adjacent to or in contact with said second securing rail of said first and/or said second floor section. By having more than one floor portion a second area, for example on the other side of the vehicle, i.e. on the other side of the floor sections can be covered by a floor portion. For example, said first floor portion can be arranged in front of the wheel housing on the driver side and a second floor portion can be arranged in front of the wheel housing, however on the other side, i.e. on the passenger side of the service vehicle.

According to at least one exemplary embodiment said at least one second floor portion comprises the same dimensions as said first floor portion. By having the floor portions identical several smaller floor portions may be arranged in an area to be covered. The floor portions may the fitted into that area as a puzzle. For example, several square shaped or rectangular shaped or any other suitable shaped floor portions may be fitted into that area. Further, one dimension of a floor portion may also fit to different areas, for example one may fit on the driver side and the other one may fit on the passenger side.

According to at least one exemplary embodiment said at least one second floor portion comprises the same dimensions as said first floor portion, however mirror inverted.

According to at least one exemplary embodiment said at least one second floor portion has a different shape than said first floor portion. According to at least one exemplary embodiment said first and said second floor section have the same dimensions.

According to at least one exemplary embodiment said first and said second floor section have different dimensions between the first and the second edge of the floor panel.

According to at least one exemplary embodiment an end of said first and/or said second securing rail of said first floor section is adapted to face and be arranged adjacent to or in contact with an end of a respective first and/or second securing rail of said second floor section. With other words, when the floor system is arranged on the inner floor the end of said first securing rail, which is at the second edge of said floor panel of said first floor section, is facing and arranged adjacent to or in contact with an end of the first securing rail of the second floor section, which end is at the first edge of said floor panel of said second floor section. The same applies for the second securing rail. This to accomplish that a rectilinear securing track is formed. That is, the first securing rails are arranged in a substantially straight line one after the other. The same may apply for the second securing rails.

According to at least one exemplary embodiment said first securing rail comprises at each end mutually matching positioning members for connecting said first securing rail of said first floor section with said first securing rail of said second floor section. This accomplish a correct position of the first floor section relative the second floor section and it is ensured that a rectilinear securing track is formed.

According to a second aspect of the invention a vehicle, such as a service vehicle, comprising a floor system as described above is accomplished.

According to a third aspect of the invention it is accomplished a method of installing a floor system to an inner floor of a cargo or a back space of a service vehicle, said method comprising the steps:
  providing at least a first and a second prefabricated floor section, each comprising a floor panel and at least one securing rail fixedly attached to one edge of said floor panel,
  providing at least one floor portion or instructing to use at least one floor portion,
  placing or instructing to place said at least one floor portion and said first and second prefabrication floor sections on said inner floor such that a first outer edge of the floor portion is adjacent to or in contact with said at least one securing rail of said first and/or second floor section.

The term "providing" is to be understood as follows: a supplier of the floor system sending or giving the installer the prefabricated floor sections alone or together with the floor parts.

The term "instructing" is to be understood as follows: a supplier of the floor system instructing the installer of the prefabricated floor sections to provide for the floor portions himself.

The term "placing" is to be understood as the installer of the prefabricated floor sections is placing the at least one floor portion and said first and second prefabricated floor sections on said inner floor.

The term "instructing to place" is to be understood as the supplier of the floor system instructing the installer of the prefabricated floor sections to place the at least one floor portion and said first and second prefabrication floor sections on said inner floor.

According to at least one exemplary embodiment said method further comprising the step:

instructing to remove material from said floor portion from at least a second outer edge.

The term "instructing" is to be understood as follows: a supplier of the floor system instructs the installer of the prefabricated floor to remove material from said floor portion.

According to at least one exemplary embodiment wherein the step placing or instructing to place said first and second prefabrication floor sections on said inner floor comprising using an adhesive between said at least one securing rail and said inner floor. The floor system is preferably attached to the vehicle body by gluing the securing rail to the underlying floor of the cargo or the back space.

The structural features defined in the third aspect may be modified and used in accordance with any one of the embodiment of the first aspect.

According to a fourth aspect of the invention it is accomplished a method of installing a floor system to an inner floor of a cargo or a back space of a service vehicle, wherein said floor system comprises a first floor section and a second floor section, each of said first and said second floor section comprises a floor panel having at least a first edge and a second edge and a third edge, wherein said first edge is opposite said second edge and said third edge is extending at a right angle from said first to said second edge of said floor panel, and a first securing rail fixedly attached to said third edge of said floor panel;

said floor system further comprising at least one floor portion, which is smaller than said first and/or said second floor section, and said floor portion discloses a first outer edge which follows the contour of said first securing rail of said first and/or said second floor section and said first outer edge of said floor portion is intended to be placed adjacent to or in contact with said first securing rail of said first and/or said second floor section during use, said method comprising the following steps:

arranging said first and said second floor sections next to each other on said inner floor such that said second edge of said floor panel of said first floor section is placed facing and adjacent to or in contact with said first edge of said floor panel of said second floor section in the longitudinal direction of the service vehicle such that said first securing rails of said first and said second floor section are extending in the longitudinal direction of said service vehicle, adapting said at least one floor portion, if necessary, so that it fits on the inner floor of said cargo or said back space in said service vehicle arranging said at least one floor portion adjacent to said first securing rail of said first and/or said second floor section such that said first outer edge of said floor portion is placed adjacent to or in contact with said securing rail.

According to a fifth aspect of the invention it is accomplished a method of arranging a floor system to an inner floor of a cargo or a back space of a service vehicle, wherein said floor system comprises a first floor section and a second floor section, each of said first and said second floor section comprises a floor panel having at least a first edge and a second edge and a third edge, wherein said first edge is opposite said second edge and said third edge is extending at a right angle from said first to said second edge of said floor panel, and a first securing rail fixedly attached to said third edge of said floor panel;

said floor system further comprises at least one floor portion, which is smaller than said first and/or said second floor section, and said floor portion discloses a first outer edge which follows the contour of said first securing rail of said first and/or said second floor section and said first outer edge of said floor portion is intended to be placed adjacent to or in contact with said first securing rail of said first and/or said second floor section during use, said method comprises the following steps:

adapting said at least one floor portion, if necessary, so that it fits on the inner floor of said cargo or said back space in said service vehicle arranging said at least one floor portion on said inner floor, arranging said first and said second floor sections next to each other on said inner floor such that said second edge of said floor panel of said first floor section is placed facing and adjacent to, or in contact with said first edge of said floor panel of said second floor section in the longitudinal direction of the service vehicle such that said first securing rails of said first and said second floor section are extending in the longitudinal direction of said service vehicle, and arranging said first securing rail of said first and/or said second floor section adjacent to or in contact with said first outer edge of said floor portion.

According to at least one exemplary embodiment said first and said second floor sections are prefabricated.

According to at least one exemplary embodiment wherein adapting said at least one floor portion so that it fits on the inner floor of said cargo or said back space in said service vehicle comprises removing material from said floor portion.

According to at least one exemplary embodiment each of said first and said second floor sections comprises further a second securing rail which is fixedly attached to a fourth edge of said floor panel, said fourth edge extending at a right angle from said first edge to said second edges of said floor panel opposite said third edge, said floor system further comprises at least a second floor portion, wherein said method further comprises the steps:

adapting said second floor portion, if necessary, so that it fits on the inner floor of said cargo or said back space in said service vehicle arranging a first outer edge of said at least one second floor portion adjacent to said first securing rail and/or said second securing rail of said first and/or said second floor section, or arranging said second securing rail of said first and/or said second floor section adjacent to or in contact with said a first outer edge of said second floor portion.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise.

Other objectives, features and advantages of the present invention will appear from the following detailed disclosure, as well as from the drawings.

BRIEF DESCRIPTION OF THE DRAWINGS

The above, as well as additional objects, features and advantages of the present invention, will be better understood through the following illustrative and non-limiting detailed description of exemplary embodiments of the present invention, with reference to the appended drawings, where the same reference numerals will be used for similar elements, wherein:

FIG. 3 discloses a floor section according to the invention in perspective from above.

FIG. 3a discloses the cross-section C-C in FIG. 3.

FIG. 3b discloses a partial enlarged view of FIG. 3.

FIG. 4 discloses the floor section in FIG. 3 in perspective from below.

FIG. 4a discloses a partial enlarged view of FIG. 4.

FIG. 5 discloses a perspective view of a stack of floor sections on a pallet.

All the figures are highly schematic, not necessarily to scale, and they show only parts which are necessary in order to elucidate the invention, other parts being omitted or merely suggested.

DETAILED DESCRIPTION OF EXEMPLARY EMBODIMENTS

An embodiment of the invention will be described in more detail in the following with reference to the accompanying drawings.

Figure 1:
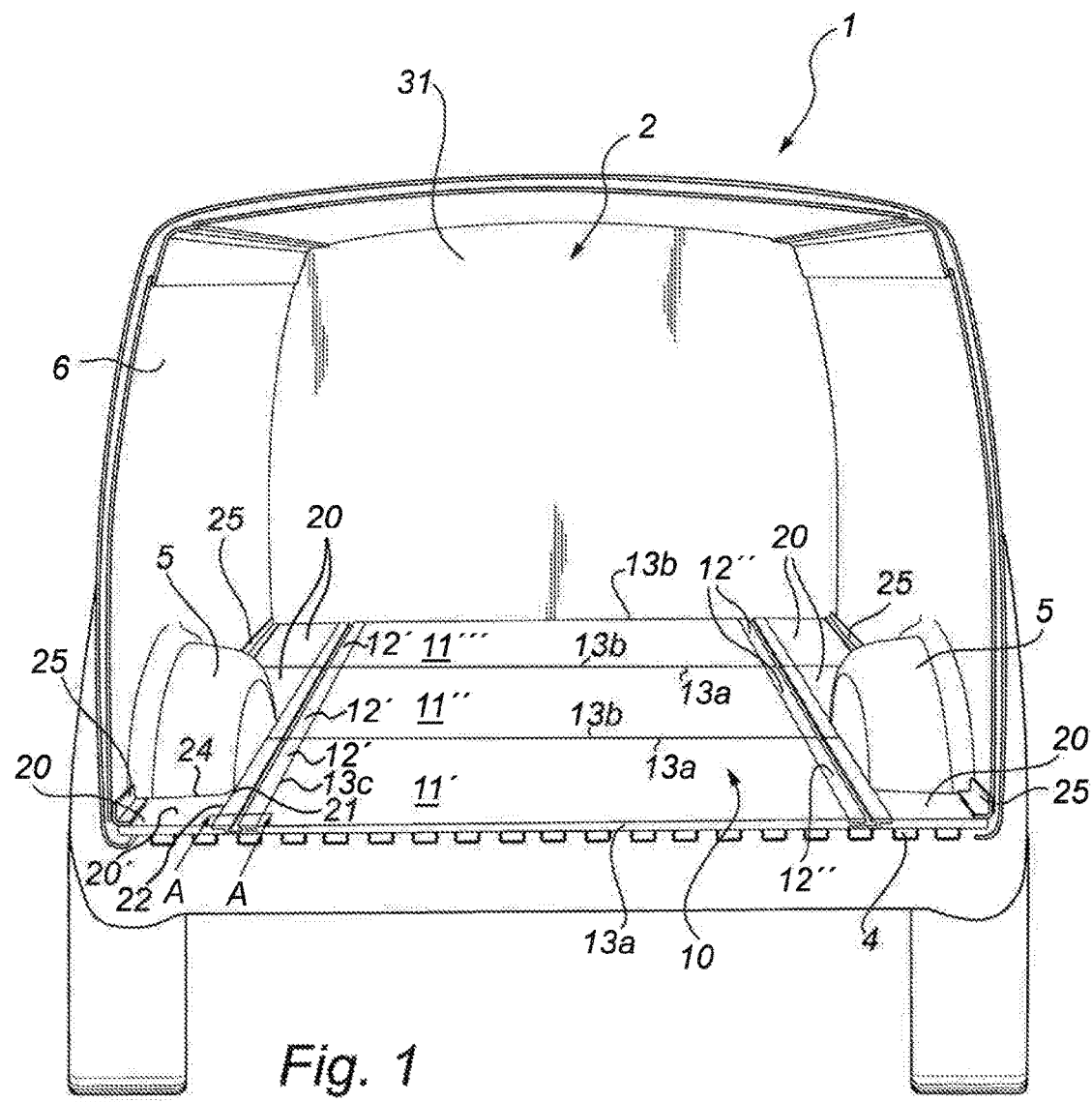
FIG. 1 discloses an open-up perspective view of a service vehicle from comprising a floor system according to the invention.

FIG. 1 shows a cargo or a back space 2 in a service vehicle 1 with a floor system 10 arranged on the inner floor 4 of the cargo or back space 2. Module units (not shown) such as a drawer unit containing for example drawers or shelves, can be placed and fixated on the installed inner floor system 10. The floor system 10, also shown in FIG. 2, and which is described together with FIG. 1 comprises of several floor sections 11, i.e. a first floor section 11', a second floor section 11" and a third floor section 11''', each comprising a first securing rail 12' and a second securing rail 12". The floor sections 11 are arranged on the inner floor 4 and in contact with each other. One end of said first securing rail 12' of the first floor section 11' is facing and arranged in contact with an end of the first securing rail 12'of the second floor section 11". The other end of the first securing rail 12' of the second floor section 11" is facing and arranged in contact with an end of the first securing rail 12' of the third floor section 11'''. The same applies for the second securing rails 12" of said floor sections 11. Alternatively they may be arranged adjacent to each other and not in contact, i.e. at a small distance from each other.

Said floor system 10 further comprises several smaller floor portions 20 on both sides of the floor sections 11. The floor portions may work as leveling sections. The module units (not shown) are placed on the floor system 10 and they are being fixated to the securing rails 12', 12". The securing rails 12', 12"of the floor sections 11 are fastened to the inner floor 4 of the cargo or back space 2 and they will take up the forces of the module units during driving and during a crash. The securing rails 12', 12" are fastened to the inner floor 4 by adhesives. The adhesive may for example be an adhesive tape (not shown) prefixed to the securing rails 12', 12" or an adhesive which is being applied to the underside of the securing rails 12', 12" when mounting the floor system 10 to the inner floor 4 of the cargo or back space 2.

Figure 2:
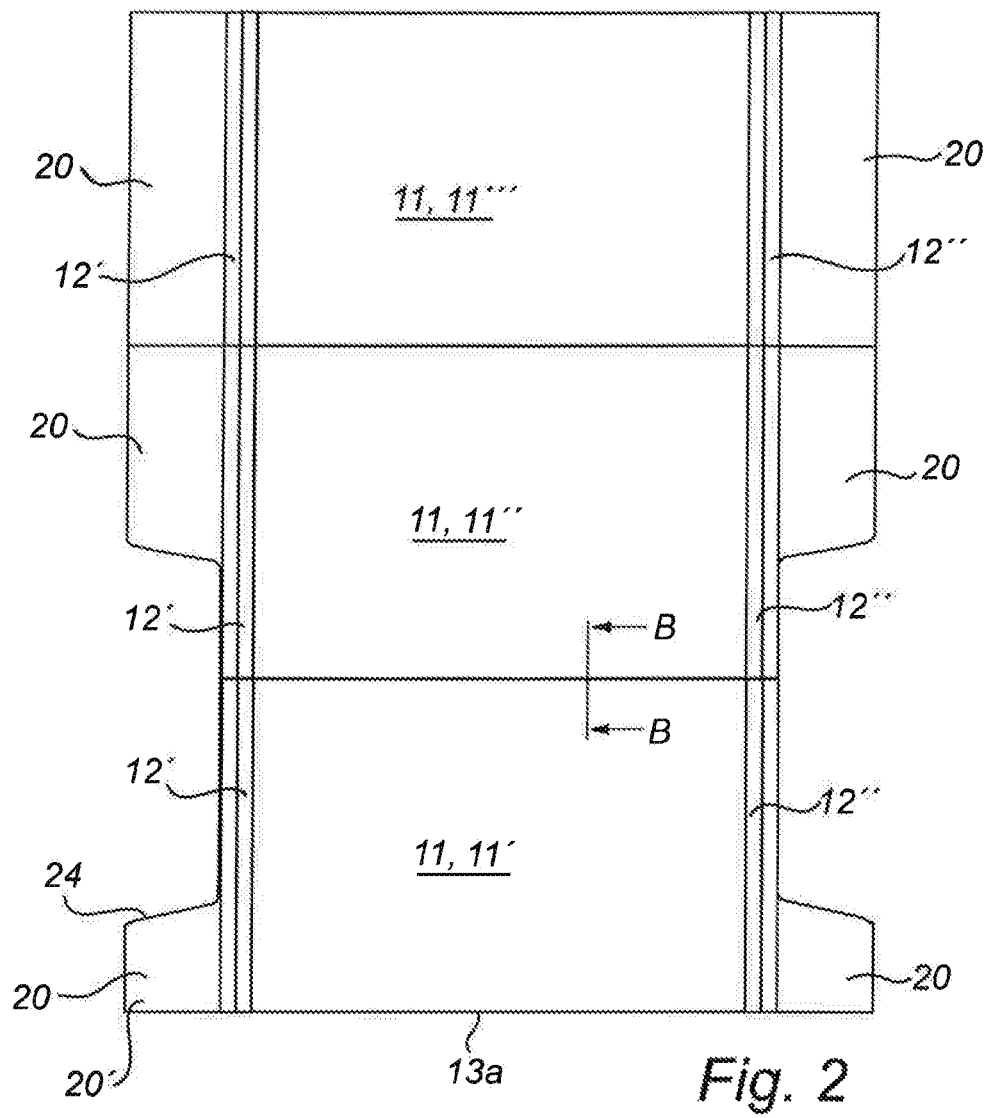
FIG. 2 discloses a top view of the floor system in FIG. 1 without the service vehicle.

FIG. 3 and FIG. 4 show one of the floor sections 11 in FIG. 1 and FIG. 2. FIG. 3 is showing the floor section 11 from above and with a first edge 13a shown in the front and FIG. 4 is showing the floor section 11 from below with the second edge 13b shown in the front. The floor section 11 shown is exemplified as the first floor section 11', however the second floor section 11" and the third floor section 11''' are identical and will hence not be described further. However, the different floor sections 11 may vary in dimensions in the longitudinal direction of the service vehicle. The floor section 11 comprises of a floor panel 13. The floor panel 13 is rectangular. The floor panel 13 further comprises a first edge 13a and a second edge 13b, wherein said first edge 13a is opposite said second edge 13b. The floor panel also comprises a third edge 13c and a fourth edge 13d oppositely arranged from each other and perpendicular to said first and said second edges 13a, 13b. That is, the third and the fourth edge 13c, 13d are each extending at a right angle from said first edge 13a to said second edge 3b.

A first securing rail 12' is fixedly arranged to the third edge 13c and a second securing rail 12" is fixedly arranged to said fourth edge 13d by a tongue/groove connection 14 as shown in FIG. 3a. The securing rails 12', 12" are made of metal and they comprises each an undercut groove 26, in order to fasten interiors such as model units thereto. The undercut groove 26 is essentially T-shaped. The undercut groove 26 is arranged on the side of the securing rail, which will be facing the inside of the cargo or back space of the service vehicle. Each securing rails 12', 12" also comprises a groove 27 along one side, i.e. on the side which be fixedly arranged to the floor portion 13. The third edge 13c and the fourth edge 13d of the floor panel 13 each comprises a mutually matching tongue 16 protruding from respective said third edge 13c and fourth edge 13d. The tongue 16 is arranged in the groove 27 of the securing rail 12'. The two parts are further fixed arranged to each other by screw joints 17 (only shown in FIG. 3a) along the longitudinal direction of the securing rail 12'. The securing rails 12', 12" are not limited to be connected to the floor panel 13 by using a tongue/groove connection 14 and screw joints 17. They may be connected any other suitable way. The side of each securing rails 12', 12" which are facing the inside of the cargo or back space is arranged at the same level, i.e. on the same plane as the top surface of the floor panel 13. The securing rails 12', 12" and the floor panel 13 have substantially the same thickness. This way the top of each securing rails 12', 12" and the top of the floor plate 13 (which will be facing the inside of the cargo or back space 2) are at the same level, i.e. on the same plane and the underside of each securing rails 12', 12" and the underside of the floor plate 13 (which will be facing the inner floor 4 of the cargo or back space 2) are at the same level, i.e. on the same plane. The thickness of the floor panel 13 is dependent on the material it is made of. The securing rails 12', 12" has a length which is substantially the same as the distance between the first edge 13a and the second edge 13b of said floor panel 13.

The floor sections are prefabricated and they have a size which is equal or smaller than a standard American pallet or a EUR-pallet. The EUR-pallet has a dimension which is 1200×800 mm, while the standard American pallet type of 40 by 48 inches (1,016 mm×1,219 mm). FIG. 5 shows several floor sections 11 arranged on a EUR-pallet 7. Referring to FIG. 3 and FIG. 4 the floor section 11 has a width, which is approximately as large as the larger dimension of the EUR-pallet, i.e. 1200 mm. The outer width W is defined as the length of the floor section, between two outer edges of the floor section 11 which are perpendicular to said first and said second edges 13a, 13b of said floor panel 13.

The floor section 11 has a length L between the first edge 13a and the second edge 13b of the floor panel 13 which is approximately as large as the smaller dimension of the EUR-pallet, i.e. 800 mm. However, the floor sections are not limited to these dimensions. The securing rails 12', 12" has on one end a positioning member 18 (See FIG. 3b) arranged and on the opposite end a mutually matching opening 19, so that during use when said first floor section 11' and said second floor section 11" are arranged adjacent to each other the positioning members 18 fits into the mutually matching opening 19. This opening 19 is exemplified as being a part of the undercut groove 26 in the securing rails 12', 12" and the positioning member 18 is inserted in the undercut groove 26 on the opposite side of the securing rail 12', 12". This accomplish a correct position of the first floor section 11' relative the second floor section 11" and a correct position of the second floor section 11" relative the third floor section 11'" so that it is ensured that a rectilinear securing track is formed.

The first edge 13a of the floor panel 13 comprises a tongue 29 protruding from said first edge 13a and extending along the first edge 13a (see FIG. 3 and FIG. 3a). The second edge 13b comprises a mutually matching groove 28 (see FIG. 4 and FIG. 4a).

Figure 2A:
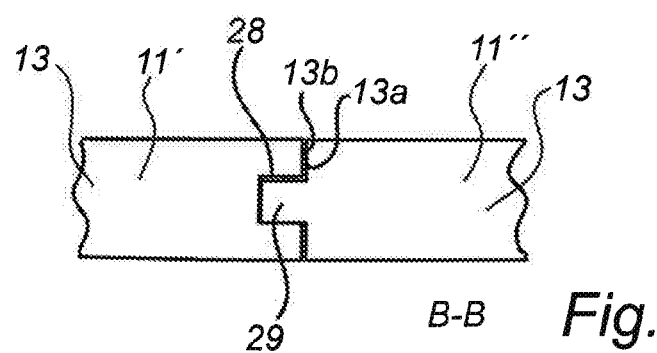
FIG. 2a discloses the cross-section B-B in FIG. 2.

During use when said first and second floor sections 11', 11" are arranged next to each other, which is shown in FIG. 1 and in FIG. 2 and especially in FIG. 2a, said tongue 29 of said first edge 13a of said floor panel 13 of said second floor section 11' is inserted into the groove 28 of said second edge 13b of said floor panel 13 of said first floor section 11' when said first floor section 11' is arranged adjacent said second floor section 11". The groove and the mutually matching tongue will be connected. An additional glue line can be applied to the top of the connection (not shown). The connection between two floor sections is not limited to the above described design. It may be made any suitable way. Alternatively, they need not be connected to each other at all, they may only be arranged adjacent or in contact with each other.

The floor panel 13 may be made of wood or plastic or any other suitable material. Here it is exemplified as an injection molded plastic floor panel.

Figure 1A:
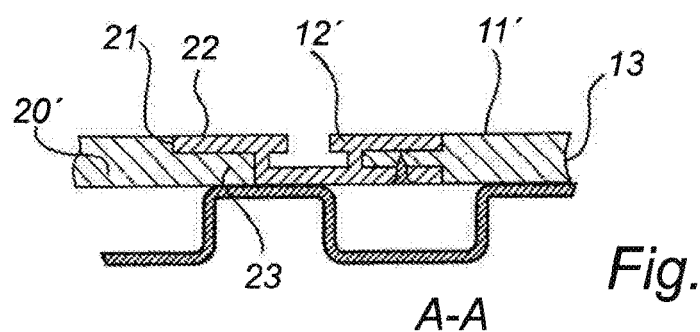
FIG. 1a discloses the cross-section A-A in FIG. 1.

FIG. 1 and FIG. 2 further shows that on both sides of the floor sections 11, several floor portions 20 are arranged. Only one will be described, in this example floor portion 20', however each floor portion 20 is made and arranged in a similar way. The floor portion 20' is smaller than said floor sections 11 and said floor portion 20'comprises a first outer edge 21, which is also shown in FIG. 1 a, which follows the contour of said first securing rail 12' of said first floor section 11'. The floor portion 20' and the floor panel 13 of the first floor section 11' are arranged on opposite sides of the first rail 12' of said first floor section 11'. As seen in FIG. 1a the securing rail 12' comprises a protruding member 22 which protrudes along the extension of the securing rail 12'. Said floor portion 20' comprises a similar protruding member 23 which protrudes from the first outer edge 21 of the floor portion 20'. The protruding member 22 of said securing rail 12' is so designed that the top of the protruding member will be on the same level, i.e. on the same plane as the top of said floor portion 20' which is facing the inside of the service vehicle and it will be overlapping the protruding member 23 of the floor portion 20' such that when said floor portion 20' is arranged on the inner floor 4 of the service vehicle 1 the floor portion 20'will be hold in place by said protruding member 22 of said securing rail 12'. This "holding in place"-design can however be made differently. Alternatively the floor portion 20' can be loosely arranged on the inner floor 4. In FIG. 1 is also fixing rails 25 arranged to the inner wall 6 of the service vehicle 1 in order to hold the floor portions 20, 20' in place. These fixing rails 25 are also optional. The floor portion 20' has been adapted to the outer contour of the inner floor 4 of the backspace 2 of the service vehicle 1. For example, a second side 24 has been adapted to be arranged next to the wheel house 5 of the service vehicle 1. The floor portions 20, 20' may be cut out from a larger piece of material or provided as smaller pieces and delivered prefabricated or the installer may cut the floor portions himself. The floor portions may be further adapted to the interior of the back space 2 by removing material from the floor portions 20, 20'. The removing of material may be done by either cutting or sawing the floor portions into the right size. The floor portions 20, 20' are made from the same material as the floor panel 13 and have the same thickness. The floor portions 20, 20'is however not limited to have the same material, it may differ.

When installing the floor system 10 on the inner floor 4 of the cargo or the back space 2 of the service vehicle 1 the installer which shall install the floor system 10 is provided with the prefabricated floor sections 11 from the supplier. The prefabricated floor sections 11 may be stacked on top of each other and be delivered on a pallet to the installer. FIG. 5 shows the floor sections 11 stacked on a EUR-pallet 7. The installer is also provided with at least one floor portion 20, 20' or he/she is instructed by the supplier to use at least one floor portion 20, which he may provide himself.

The installer then places the floor sections 11, next to each other in the longitudinal direction of the service vehicle so that the securing rails 12', 12" of all floor sections are extending in the longitudinal direction of the service vehicle 1 (see FIG. 1) and connects the floor sections together by inserting the tongues 29 with respective grooves 28 and inserting the position members 18 in their respective holes 19, so that the securing rails 12', 12" of said first, second and third floor sections 11', 11", 11'" are arranged in one line in the longitudinal direction of the service vehicle . The first securing rail 12' of the first floor section 11' comprises an end, which is arranged at the second edge 13b of said floor panel 13 of said first floor section 11'. This end of said first securing rail 12' of the first floor section 11' is facing and arranged in contact with an end of the first securing rail 12' of the second floor section 11". This end of the first securing rail 12' of the second floor section 11" is arranged at the first edge 13a of said floor panel 13 of said second floor section 11". The other end of the first securing rail 12'of the second floor section 11", which end is arranged at the second edge 13b of said floor panel 13 of said second floor section 11" is facing and arranged in contact with an end of the first securing rail 12' of the third floor section 11'". This end of the first securing rail 12' of the third floor section 11'" is arranged at the first edge 13a of said floor panel 13 of said third floor section 11'". The same applies for the second securing rails 12" of said floor sections 11.

The floor sections 11 may be arranged in this order (see FIG. 1): First the second floor section 11" is arranged on the inner floor 4 with its first edge 13a arranged approximately in front of the wheel house 5 (see its position in FIG. 1) such that another floor section, in this case the first floor section 11' can be arranged between the wheel housings 5. In a second step the first floor section 11' is arranged on the inner floor 4 and to the second floor section 11". In a third step the third floor section 11' is arranged to the inner floor 4 and to the second floor section 11". Alternatively, the third floor section 11''' may be arranged prior to the first floor section 11'. The securing rails 12', 12" may at the same time be secured to the inner floor 4 by using an adhesive. For example the underside 30 of the securing rails 12', 12" (see FIG. 4a) may be provided with an adhesive tape. Alternatively, adhesive may be applied to the underside of the securing rail 12', 12" or to the inner floor 4 when arranging the floor sections 11 to the inner floor 4.

If there are parts of the inner floor 4 which have not been covered by the floor sections 11, for example if the third floor section 11''' is not extending all the way to the inner wall 31, which is placed behind the driver cabin (not shown) or if there is a space between the first floor section 11' and the back door of the service vehicle (not shown) end floor pieces (not shown) may be arranged in these areas. These end floor pieces may have a tongue or groove which is mutually matching to the tongue/groove connection on the floor sections 11 so that they can be attached thereto. However, other suitable attachments are also possible.

In the next step the floor portions 20, 20' are arranged to the inner floor 4 such that the first outer edge 21 of each floor portion 20, 20' is adjacent to or in contact with said at least one of the securing rail 12', 12" of said first, second or third floor section 11', 11", 11". If the floor portions 20', 20' are too large the installer can adapt the other edges, for example a second edge 24 of the floor portions to the surrounding by removing material and/or a third and/or a fourth edge. The protruding members 23 of the floor portions 20, 20' shown in FIG. 7 may be pushed beneath the protruding member 22 of the securing rail 12', 12".

Alternatively, the installer may place the floor portions 20, 20' first and adapt them to the surrounding before the floor sections 11 are arranged next to each other in the longitudinal direction of the service vehicle and next to the floor portions. The floor portions 20, 20' may then guide the floor sections 11 so that they are properly arranged in the service vehicle 1 such it is accomplished that the floor sections are arranged in the longitudinal direction of the service vehicle 1. The floor sections 11 may be further attached to the inner floor by applying adhesive or/and adhesive tape on the side of the floor sections 11 which will be facing the inner floor 4.

It should be understood that the present inventive concept has a further benefit. While it is practical to be able to ship floor sections 11 on a pallet 7 as illustrated in FIG. 5, it has been realized that one and the same supplier can additionally ship for example cupboards, tool holders, shelves or other module units on top of the floor sections 11 on the pallet 7. This is beneficial since a buyer can get the floor sections and the cupboards, shelves etc. in one and the same delivery, thus reducing the delivery costs by approximately 50%. The practice today is, on the contrary, more expensive, since a buyer has to pay for the delivery of a service vehicle floor from one supplier and the delivery of the cupboards, shelves etc. from another supplier.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A floor system configured to be arranged on an inner floor of a cargo or a back space of a service vehicle, said floor system comprising:
   a first and a second prefabricated floor section, each one of said first and said second floor sections including
      a floor panel, said floor panel including a first edge and a second edge, wherein said first edge is arranged opposite said second edge, said first and said second floor sections configured to be arranged next to each other such that said second edge of said floor panel of said first floor section is placed facing and adjacent to, or in contact with said first edge of said floor panel of said second floor section, and
      a separate first integrated securing rail fixedly attached to a third edge of said floor panel, said third edge extending at a right angle from said first edge to said second edge-of said floor panel,
      wherein said separate first integrated securing rail includes, at one end, a positioning member, and at an other end, a mutually matching opening, such that at least one positioning member of a separate first integrated securing rail of said first floor section is configured to connect said separate first integrated securing rail of said first floor section with a mutually matching opening of a separate first integrated securing rail of said second floor section to connect the separate first integrated securing rails of the first and second floor sections to each other in a longitudinal direction of the service vehicle; and
   a floor portion, the floor portion smaller than said first floor section and/or said second floor section, said floor portion including a first outer edge which follows a contour of said separate first integrated securing rail of said first and/or said second floor section and which is configured to be placed adjacent to or in contact with said separate first integrated securing rail of said first and/or said second floor section during use.

2. A floor system according to claim 1, wherein each one of said first and said second floor sections further includes a separate second integrated securing rail fixedly attached to a fourth edge of said floor panel, said fourth edge extending at a right angle from said first edge to said second edge of said floor panel opposite said third edge.

3. A floor system according to claim 2, wherein
   said floor portion is a first floor portion, and
   said floor system further includes at least one second floor portion, which is smaller than said first and/or said second floor section and said second floor portion includes a first outer edge which follows the contour of said separate second integrated securing rail of said first and/or said second floor section and which is configured to be placed adjacent to or in contact with said separate second integrated securing rail of said first and/or said second floor section.

4. A floor system according to claim 2, wherein an end of said separate first and/or said second integrated securing rail of said first floor section is configured to face and be arranged adjacent to or in contact with an end of a respective separate first and/or second securing rail of said second floor section.

5. A floor system according to claim 1, wherein each separate first integrated securing rail of each floor section has a longitudinal extension which extends from said first edge to said second edge of said floor panel of said floor section.

6. A floor system according to claim 1, wherein said floor portion includes a second outer edge configured to follow a part of the contour of said inner floor of said cargo or said back space in said service vehicle by removal of material from said floor portion.

7. A floor system according to claim 1, wherein
said floor portion is a first floor portion, and
said floor system further includes at least one second floor portion, which is smaller than said first and/or said second floor section and said second floor portion includes a first outer edge which follows the contour of said separate first integrated securing rail of said first and/or said second floor section and which is configured to be placed adjacent to or in contact with said separate first integrated securing rail of said first and/or said second floor section.

8. A floor system according to claim 7 wherein said at least one second floor portion has common dimensions as said first floor portion.

9. A floor system according to claim 7, wherein said at least one second floor portion has a different shape than said first floor portion.

10. A floor system according to claim 1, wherein said first and said second floor section have common dimensions.

11. A vehicle comprising:
a floor system according to claim 1.

12. A method of installing a floor system to an inner floor of a cargo or a back space of a service vehicle, said method comprising:
providing at least a first and a second prefabricated floor section, each floor section including a floor panel and at least one separate integrated securing rail fixedly attached to one edge of said floor panel, wherein each separate integrated securing rail includes, at one end, a positioning member, and at an other end, a mutually matching opening, such that at least one positioning member of a separate integrated securing rail of said first prefabricated floor section is configured to connect said separate first integrated securing rail of said first prefabricated floor section with a mutually matching opening of a separate integrated securing rail of said second prefabricated floor section to connect the separate integrated securing rails of the first and second prefabricated floor sections to each other in a longitudinal direction of the service vehicle, providing at least one floor portion or instructing to use at least one floor portion, placing or instructing to place said at least one floor portion and said first and said second prefabrication floor sections on said inner floor such that a first outer edge of said floor portion is adjacent to or in contact with said at least one separate integrated securing rail of said first and/or said second floor section.

13. Method according to claim 12, further comprising:

instructing to remove material from said floor portion from at least a second outer edge.

14. Method according to claim 13 further comprising:

arranging said first and said second prefabricated floor sections to said inner floor of said cargo or said back space based on using an adhesive between said at least one separate integrated securing rail and said inner floor.

* * * * *